United States Patent [19]

Slocomb, Jr.

[11] Patent Number: 5,105,581

[45] Date of Patent: * Apr. 21, 1992

[54] ULTRA-SOUND WELDED WINDOW FRAMES

[75] Inventor: Leon F. Slocomb, Jr., Wilmington, Del.

[73] Assignee: Slocomb Industries, Wilmington, Del.

[*] Notice: The portion of the term of this patent subsequent to Aug. 15, 2006 has been disclaimed.

[21] Appl. No.: 395,468

[22] Filed: Aug. 18, 1989

[51] Int. Cl.⁵ .............................. E06B 1/04
[52] U.S. Cl. .................. 49/504; 49/DIG. 2; 49/506; 52/656; 403/295; 403/403
[58] Field of Search ......... 49/504, 501, 380, DIG. 2; 160/381; 52/656, 288, 204, 475; 403/403, 295, 401, 402

[56] References Cited

U.S. PATENT DOCUMENTS

| 2,004,727 | 6/1935 | Keller | 403/295 X |
| 3,131,793 | 5/1964 | Bohn | 52/656 |
| 4,042,288 | 8/1977 | Litchfield | 160/381 X |
| 4,090,799 | 5/1978 | Crotti et al. | 52/656 X |
| 4,205,486 | 6/1980 | Guarnacci | 49/504 X |
| 4,286,716 | 9/1981 | Budich et al. | 49/504 X |
| 4,483,099 | 11/1984 | Schmidt | 49/504 X |
| 4,570,406 | 2/1986 | DiFazio | 52/475 X |
| 4,694,612 | 9/1987 | Pruden et al. | 49/504 X |
| 4,739,600 | 4/1988 | Lynch et al. | 52/656 |
| 4,856,230 | 8/1989 | Slocomb | 49/504 |

Primary Examiner—Philip C. Kannan
Attorney, Agent, or Firm—Connolly & Hutz

[57] ABSTRACT

A window frame is made of a plastic material which is secured together by utilization of corner key pieces at each of the four corners joining the header and the sill with a pair of jambs. The corner key pieces may be initially stapled or screwed to the frame members to create a stable unit prior to the permanent securement of the various members by means of ultra-sound welding.

15 Claims, 7 Drawing Sheets

ULTRA-SOUND WELDED WINDOW FRAMES

BACKGROUND OF INVENTION

U.S. Pat. No. 4,856,230 discloses techniques for the ultra-sound welding of a window frame. Such techniques represent distinctive improvements over the prior art. The present invention is directed to various ramifications and further improvements of those techniques.

SUMMARY OF INVENTION

An object of this invention is to provide a master frame for a window which is economical and which can be assembled in a short period of time.

A further object of this invention is to provide such a master frame based upon teachings of U.S. Pat. No. 4,856,230, but having additional advantages when compared to those practices.

In accordance with this invention, the pieces which form the master frame, namely the header, the sill and the jambs are joined together by corner keys which fit into openings in these various pieces. The pieces are extruded and have spaced ribs formed on their internal surfaces for providing a tight fit with the corner pieces and also providing material to assure a proper weld by spreading under the influence of the later ultra-sound treatment. An additional feature of the invention is the incorporation of screw bosses in the header and sill so that the corner keys may also be initially mounted in place by being screwed to these pieces. Alternatively, the initial mounting may be accomplished by the use of staples. A further feature of the invention is that the various frame pieces have straight cuts which minimizes the need for machining on the frame pieces. The jamb preferably has a square cut at one end and an angled cut at the other end. This type of cut for the frame pieces greatly reduces assembly time.

THE DRAWINGS

FIGS. 13-11 are rear and front elevation views of the jamb member shown in FIG. 12;

DETAILED DESCRIPTION

The present invention relates to a window frame wherein the individual frame members are permanently secured by ultra-sound welding along the principals described in U.S. Pat. No. 4,856,230, the details of which are incorporated herein by reference thereto. As illustrated the invention comprises a master frame 10 which is particularly intended for use in double hung windows. The master frame 10 includes pairs of structural means for accommodating two sets of windows. In general, except for specific modifications including the corner keys and the use of ultra-sound welding and other features which will be specifically referred to, the illustrated master frame is of generally conventional construction. Accordingly, it is not necessary to describe all of the details of such a known frame. In general, the master frame includes a sill 12 and a header 16 interconnected by a pair of side jambs 14. In conventional manufacturing techniques these pieces would be mitre cut and then welded together using conventional welding techniques. The present invention, however, departs from the conventional practices by utilizing straight cuts and specially designed corner keys 18,20 which are shown in the mounted form in FIGS. 1-6 and are shown in specific detail in FIGS. 22-33.

Figure 6:
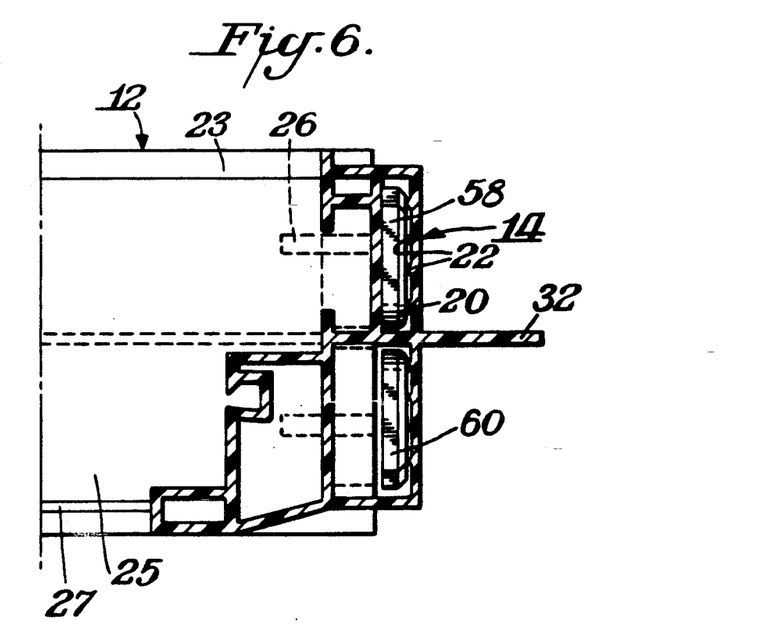
FIG. 6 is a cross-sectional view taken through FIG. 1 along the lines 6—6.
Figure 7:
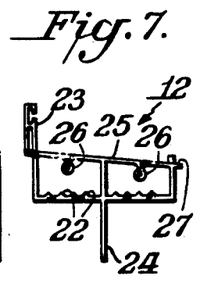
FIG. 7 is an end elevation view of a sill frame member in accordance with the invention of FIGS. 1-6.
Figure 8:
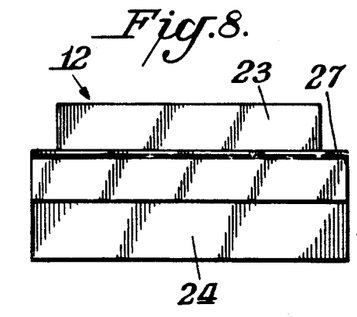
FIG. 8 is a rear elevation view of the sill member shown in FIG. 7.
Figure 15:
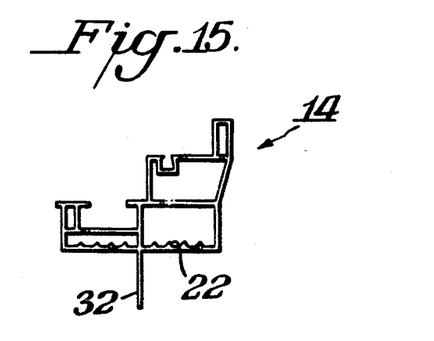
FIG. 15 is a top plan view of the jamb member shown in FIGS. 12-14.
Figure 16:
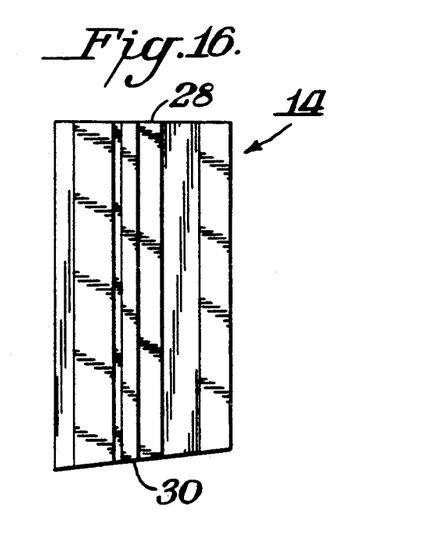
FIG. 16 is a right side elevation view of the jamb member shown in FIGS. 12-15.
Figure 17:
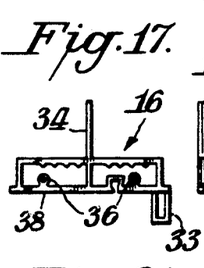
FIG. 17 is an end elevation view of a header member of the frame shown in FIGS. 1-6.
Figure 18:
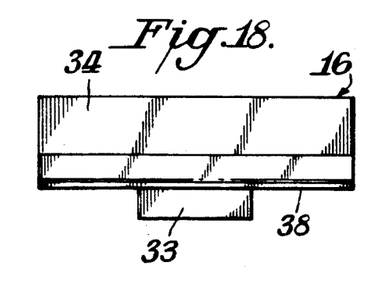
FIGS. 18-19 are rear and front elevation views of the header members shown in FIGS. 17.
Figure 19:
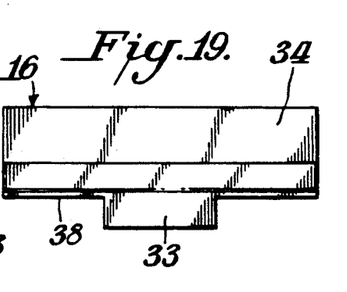
Figure 20:
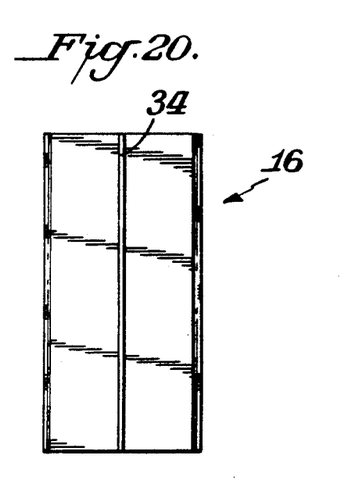
FIGS. 20-21 are top and bottom plan views of the header member shown in FIGS. 17-19.
Figure 21:
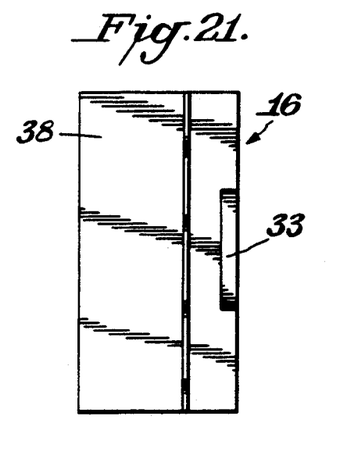

A key feature of this invention is the permanent securement of various pieces through the use of ultra-sound welding. In order to facilitate such ultra-sound welding technique, the inner surface of the various pieces are provided with raised ribs 22 as shown in FIG. 6 and also in FIGS. 7, 15 and 17. These ribs differ from the ribs described in the parent application in that the ribs 22 are pointed rather than being rounded. Ribs 22 provide material to assure a proper weld by spreading under the influence of the ultra-sound and thus enhance the weld. In addition, the raised ribs 22 help assure a snug seating of the corner pieces 18,20.

In the preferred practice of this invention, PVC is used as the material for the various components of the hollow extruded master frame. This material is particularly advantageous since it is a conventional material and thus the industry is already knowledgeable in its use. Additionally, PVC is particularly suitable for ultrasound welding. It is to be understood, however, that other suitable materials may be used without departing from the spirit of this invention.

Figure 9:
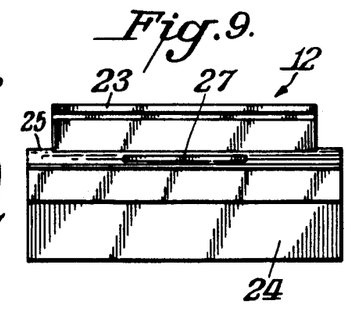
FIG. 9 is a front elevation view of the sill member shown in FIGS. 7-8.
Figure 10:
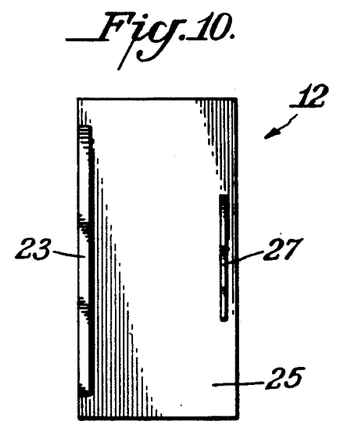
FIGS. 10-11 are top and bottom plan views of the sill member shown in FIGS. 7-9.
Figure 11:
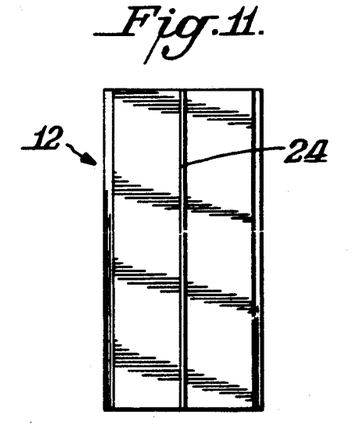
Figure 12:
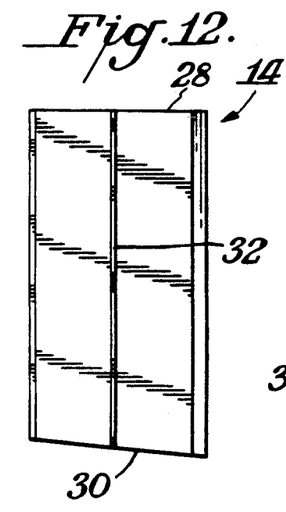
FIG. 12 is a left side view of a jamb member of the frame illustrated in FIGS. 1-6.
Figure 13:
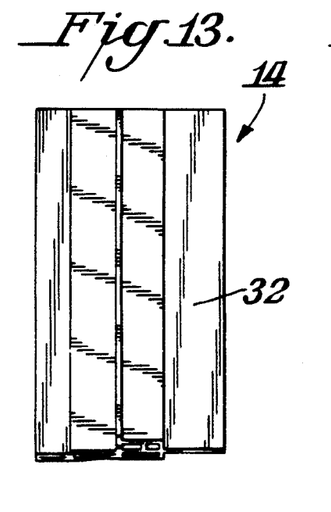
Figure 14:
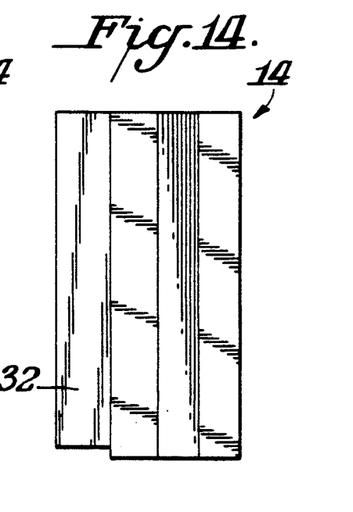

FIGS. 7-11 show the details of sill 12. Sill 12 is of generally conventional construction except that its ends are square cut and it includes pointed ribs 22 and also includes a thin flange 24 which extends at the center line of sill 12 along its entire length. Sill 12 also includes a pair of screw bosses 26 depending from inclined wall 25 for purposes later described. Because of its square cuts, sill 12 is rectangularly shaped. As shown in FIG. 9 the offset wall 23 connected to wall 25 is indented in that it terminates at each end short of the ends of wall 25. Tab 27 extends parallel to wall or tab 23.

FIGS. 12-16 illustrate the details of each jamb 14. Jamb 14 is also of generally conventional construction except for the following features. Jamb 14 includes raised pointed ribs 22. Jamb 14 has one square cut edge 28 and one edge 30 cut at a slight angle such as five degrees off the perpendicular. Jamb 14 also includes a flange 32 along its center line over the entire length of jamb 14.

FIGS. 17-21 illustrate the details of header 16. As shown therein, header 16 is square cut and thus rectangularly shaped. Header 16 also includes the central flange 34 along its outside surface centrally down its length and further includes screw' bosses 36,36. As shown, screw bosses 36,36 extend upwardly from straight wall 38. Tab or wall 33 extends perpendicularly to wall 38.

Figures 1, 2:
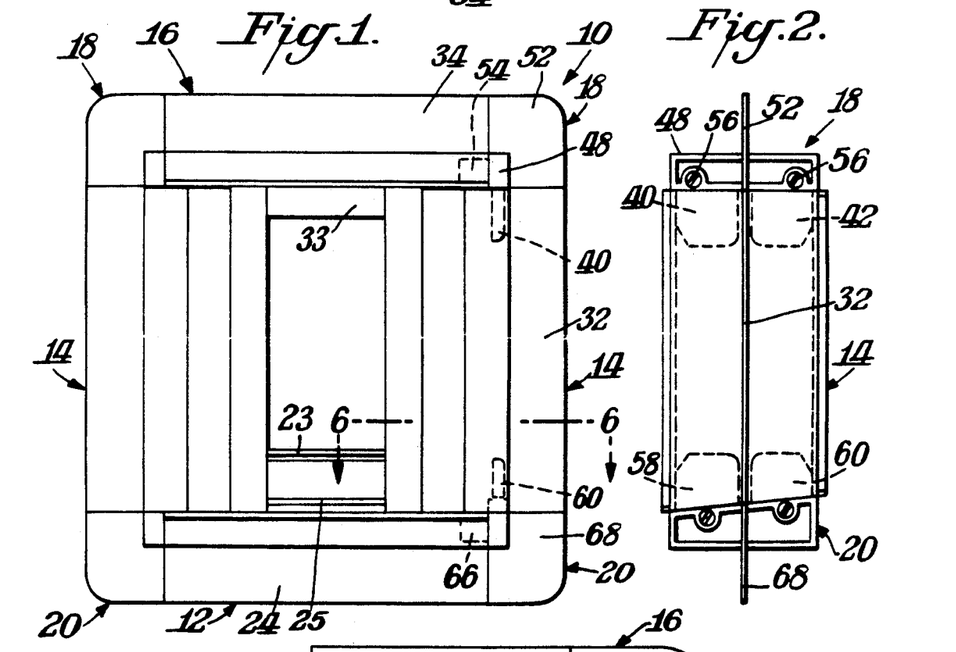
FIG. 1 is a front elevation view of a master frame in accordance with this invention.
FIG. 2 is a side elevation view of the master frame shown in FIG. 1.
Figure 3:
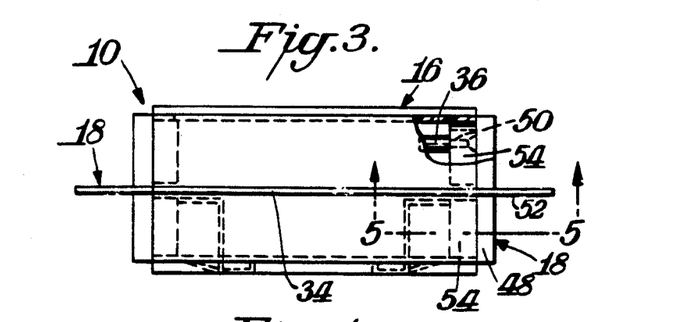
FIG. 3 is a top plan view, partly in section, of the master frame shown in FIGS. 1-2.
Figure 4:
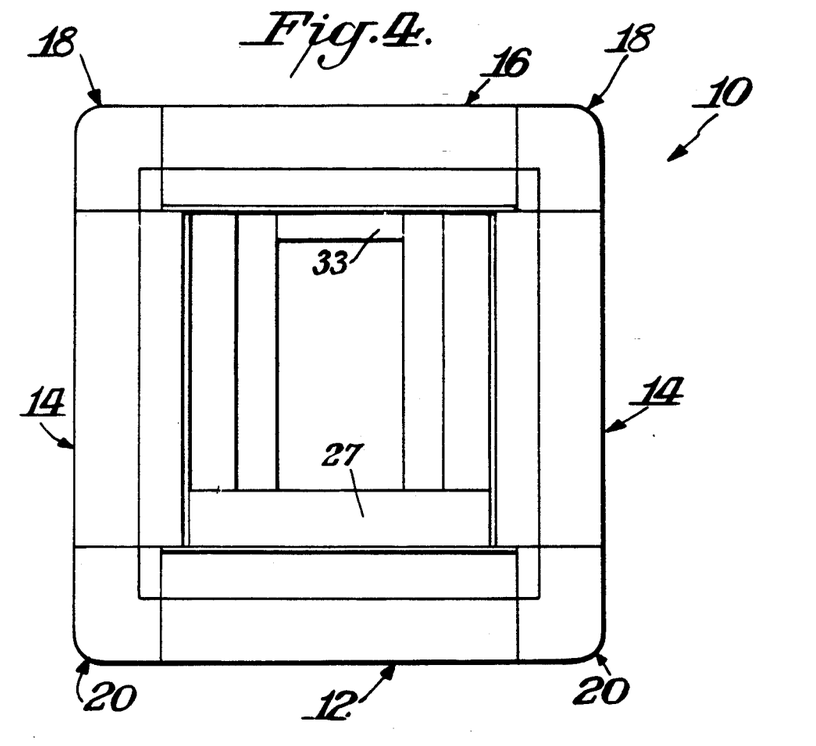
FIG. 4 is a rear elevation view of the master frame shown in FIGS. 1-3.

FIGS. 22-27 illustrate the details of upper corner 18,18. As shown in FIGS. 1 and 4 a set of two upper corner keys 18 would be provided for master frame 10 while a set of two lower corner keys 20 would also be provided.

Figure 5:
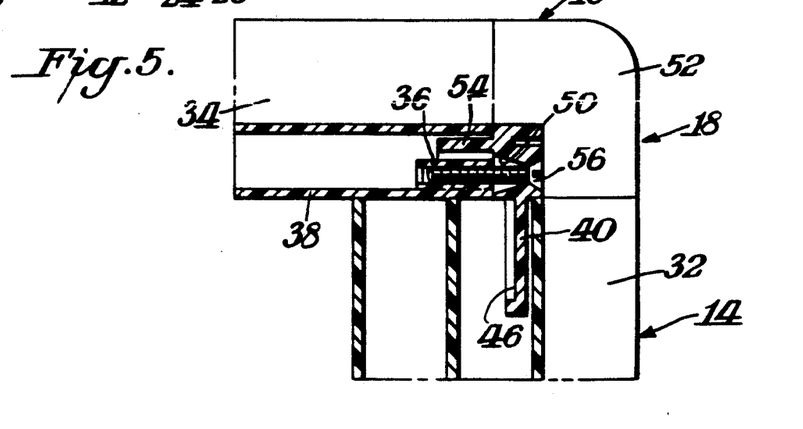
FIG. 5 is a cross-sectional view taken through FIG. 3 along the lines 5—5.
Figure 22:
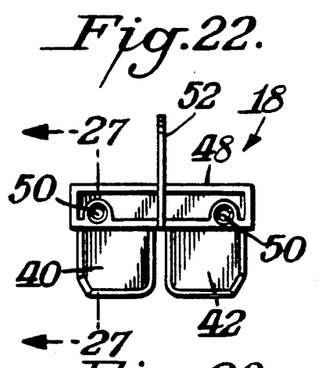
FIG. 22 is a front elevation view of an upper corner key in the frame shown in FIGS. 1-6.
Figure 23:
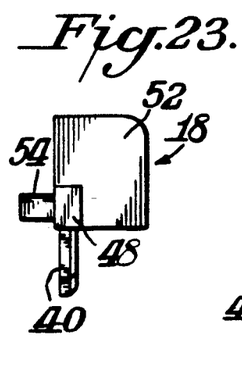
FIGS. 23-24 are side and rear elevation views of the corner key shown in FIG. 22.
Figure 24:
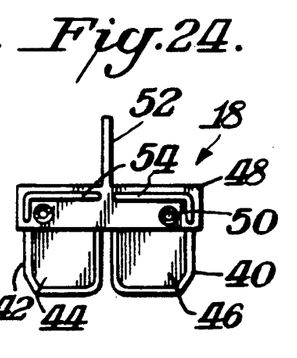
Figure 25:
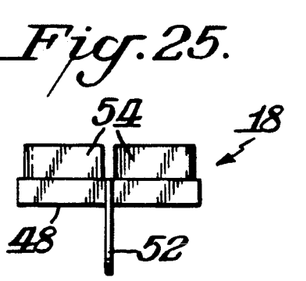
FIGS. 25-26 are top and bottom plan views of the corner key shown in FIGS. 22-24.
Figure 26:
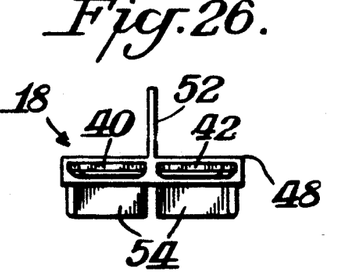
Figure 27:
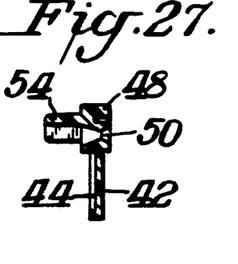
FIG. 27 is a cross-sectional view taken through FIG. 22 along the line 27—27.
Figure 28:
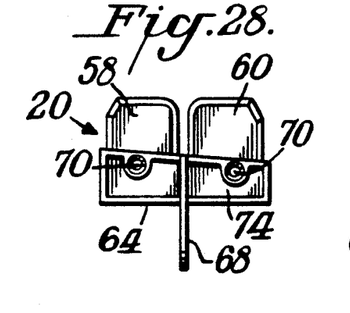
FIG. 28 is a front elevation view of a lower corner key used in the frame of FIGS. 1-6.
Figure 29:
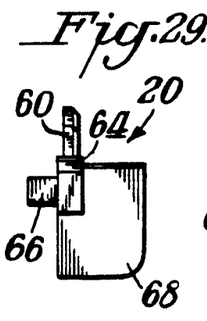
FIGS. 29-30 are side and rear elevation views of the corner key shown in FIG. 28.
Figure 30:
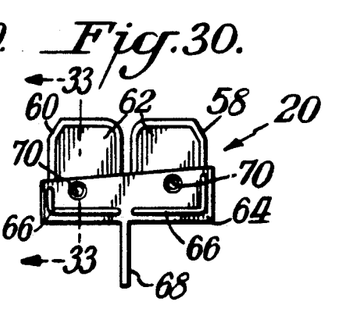
Figure 31:
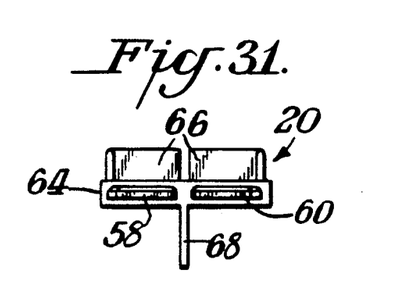
FIGS. 31-32 are top and bottom plan views of the corner key shown in FIGS. 28-30.
Figure 32:
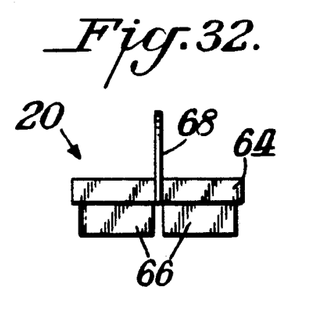
Figure 33:
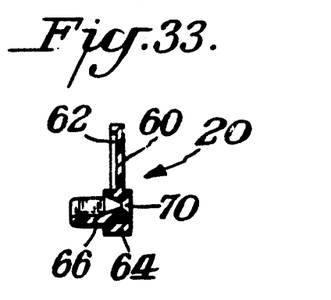
FIG. 33 is a cross-sectional view taken through FIG. 30 along the line 33—33.

As illustrated therein corner key 18 includes two sets of plate like extensions 40,42. Extensions 40,42 are generally formed as mirror images to each other and each extension includes a dished out portion 44,46 which occupies the major area of each extension. Corner key 18 also includes a central support section 48 which likewise is dished out in its surface opposite the dished out portion 44,46. A pair of hour-glass shaped holes 50,50 extend through central support section 48 which are in alignment with the screw bosses in the corresponding sill or header. The various dished out portions of corner key 18 are advantageous in that they reduce the amount of material thereby reducing the weight of the corner key and additionally reducing the heat that occurs during the welding operation which in turn helps prevent buckling. Corner key 18 also includes a flange 52 which would be juxtaposed and form a continuation of the corresponding flanges on the other parts of the master frame. Corner key 18 also includes a pair of inverted L-shaped extensions 54,54 which extend perpendicularly from central support section 48 in a plane perpendicular to the plane of extensions 40,42. The extensions 40,42 would be inserted into the exposed ends of the corresponding frame members when the frame is assembled as illustrated in, for example, FIG. 5. One extension would have a snug fit and the other would be in an oversized channel. Extensions 54,54 would also telescope into their juxtaposed frame pieces near screw bosses 36,36. During this assembly as shown in FIG. 5 screws 56 would be inserted through respective holes 50 and be threadably received in screw bosses 36 of header 16 to initially attach the header 16 and jamb 14 in a secure manner prior to the ultra-sound welding operation. Alternatively, the corner key 18 could be stapled to the header and jamb for the initial assembly.

FIGS. 28-33 illustrate the details of lower corner key 20. As indicated therein, lower corner key 20 includes a pair of plate-like extensions 58,60 having dished out surfaces 62,62. Additionally, corner key 20 includes a central support section 64, with perpendicular L-shaped extensions 66,66 and flange 68. A pair of hour-glass shaped holes 70 extend through central support section 64 near incline wall 72. Central support section 64 also has a dished-out portion 74. Holes 70,70 are aligned with screw bosses 26,26 inclined wall 72 is disposed against inclined side 70 of jamb 14. Extensions 58,60 and 66,66 fit into the corresponding extruded frame members as previously described and the various parts are initially secured together by either stapling or by screws inserted through holes 70,70 and into screw bosses 26,26.

As shown in FIGS. 1 and 4 the frame pieces mate by jambs 14, 14 fitting into the notches created by the walls or tabs 23, 27 and 33. The square cuts of the various frame members significantly reduces assembly time by, for example, about two-thirds.

After the parts are assembled by means of the screws or staples a permanent securement is achieved through the use of ultra-sound in the manner described in U.S. Pat. No. 4,856,230.

I claim:

1. A window frame comprising four perpendicularly disposed hollow extruded plastic frame pieces, each of said frame pieces terminating in a straight cut, a corner key located at the corner of each pair of adjacent frame pieces, each of said corner keys comprising a support member having at least one set of extensions arranged perpendicularly to each other, each of said corner keys being secured to a respective frame piece by screws passing through a hole in said corner key and engaged in a screw boss in a respective frame piece, each of said extensions being inserted into a respective frame piece, raised ribs on the inner surface of each frame piece in contact with said extensions, said frame pieces and said extensions being secured together by an ultra-sound weld, said ribs comprising material to assure a proper weld by spreading under the influence of the ultrasound, and said ribs further providing a snug seating of said corner keys into said frame pieces.

2. The frame of claim 1 wherein each corner key includes two sets of said extensions, and wherein said frame is of the double hung window type.

3. The frame of claim 1 wherein each of said extensions includes a plurality of dished-out portions.

4. The frame of claim 3 wherein each of said extensions includes at least one hole, and a fastener extending through said hole and connected to a respective frame piece.

5. The frame of claim 4 wherein each extension of said pair of extensions is generally a mirror image of the other extension in said pair.

6. The frame of claim 5 wherein two of said corner keys comprise upper corner keys which are identical with each other, and the other two of said corner keys comprise lower corner keys which are identical with each other.

7. The frame of claim 6 wherein each of said corner keys includes two sets of extensions.

8. The frame of claim 7 wherein one of said extensions from each of said corner keys is snugly fit into a channel in its corresponding frame piece, and the other extensions of each pair is fit into an oversized channel of its respective frame piece.

9. A window frame comprising four perpendicularly disposed hollow extruded plastic frame pieces, each of said frame pieces terminating in a straight cut, a corner key located at the corner of each pair of adjacent frame pieces, each of said corner keys comprising a support member having at least one set of extensions arranged perpendicularly to each other, each of said extensions being inserted into a respective frame piece, raised ribs on the inner surface of each frame piece in contact with said extensions, said frame pieces and said extensions being secured together by an ultra-sound weld, said ribs comprising material to assure a proper weld by spreading under the influence of the ultra-sound, said ribs further providing a snug seating of said corner keys into said frame pieces, and said ribs terminating in pointed edges.

10. A window frame comprising four perpendicularly disposed hollow extruded plastic frame pieces, each of said frame pieces terminating in a straight cut, a corner key located at the corner of each pair of adjacent frame pieces, each of said corner keys comprising a support member having at least one set of extensions arranged perpendicularly to each other, each of said extensions being inserted into a respective frame piece, raised ribs on the inner surface of each frame piece in contact with said extensions, said frame pieces and said extensions being secured together by an ultra-sound weld, said ribs comprising material to assure a proper weld by spreading under the influence of the ultra-sound, said ribs further providing a snug seating of said corner keys into said frame pieces, each of said corner keys and said frame pieces including a longitudinal flange, and said longitudinal flanges abutting each other to form a continuous flange around the periphery of said frame.

11. A window frame comprising four perpendicularly disposed hollow extruded plastic frame pieces, each of said frame pieces terminating in a straight cut, a corner key located at the corner of each pair of adjacent frame pieces, each of said corner keys comprising a support member having at least one set of extensions arranged perpendicularly to each other, each of said extensions being inserted into a respective frame piece, raised ribs on the inner surface of each frame piece in contact with said extensions, said frame pieces and said extensions being secured together by an ultra-sound weld, said ribs comprising material to assure a proper weld by spreading under the influence of the ultra-sound, said ribs further providing a snug seating of said corner keys into said frame pieces, said frame pieces comprising a sill and a header interconnected by a pair of jambs, and each of said jambs terminating in a square cut at one end thereof and an angled cut at its opposite end.

12. A window frame comprising four perpendicularly disposed hollow extruded plastic frame pieces including a sill and a header interconnected by a pair of jambs, a corner key located at the corner of each pair of adjacent frame pieces, each of said corner keys comprising a support member having at least one set of extensions arranged perpendicularly to each other, each of said extensions being inserted into a respective frame piece, screw bosses in said sill and said header, screws extending through said corner keys and engaged in said screw bosses, and each of said frame pieces having at least one of its ends straight cut.

13. The frame of claim 12 wherein one end of each jamb is square cut and the opposite end is angle cut.

14. The frame of claim 12 wherein each of said corner keys and each of said frame pieces includes a longitudinal flange, and said longitudinal flanges abut each other to form a continuous flange around the periphery of said frame.

15. The frame of claim 12 wherein said sill includes a pair of parallel tabs, said header including a tab, and said jambs being disposed against said tabs.

* * * * *